(12) United States Patent
Tokuoka et al.

(10) Patent No.: US 9,075,547 B2
(45) Date of Patent: Jul. 7, 2015

(54) PRINT SYSTEM, PRINT JOB CREATING DEVICE, PRINT JOB CREATING METHOD, AND RECORDING MEDIUM

(71) Applicants: Seiji Tokuoka, Tokyo (JP); Hiroyuki Nishiyama, Tokyo (JP); Yoshikazu Tanaka, Tokyo (JP); Shizhong Zhu, Tokyo (JP)

(72) Inventors: Seiji Tokuoka, Tokyo (JP); Hiroyuki Nishiyama, Tokyo (JP); Yoshikazu Tanaka, Tokyo (JP); Shizhong Zhu, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/188,751

(22) Filed: Feb. 25, 2014

(65) Prior Publication Data
US 2014/0268206 A1 Sep. 18, 2014

(30) Foreign Application Priority Data

Mar. 14, 2013 (JP) ................................. 2013-052507

(51) Int. Cl.
*G06K 15/00* (2006.01)
*G06F 3/12* (2006.01)

(52) U.S. Cl.
CPC ............ *G06F 3/1219* (2013.01); *G06F 3/1226* (2013.01); *G06F 3/1231* (2013.01)

(58) Field of Classification Search
None
See application file for complete search history.

(56) References Cited

U.S. PATENT DOCUMENTS

2009/0217268 A1 * 8/2009 Pandit et al. .................. 718/100

FOREIGN PATENT DOCUMENTS

| JP | 2002-281217 | 9/2002 |
| JP | 2008-126482 | 6/2008 |

* cited by examiner

*Primary Examiner* — Marcus T Riley
(74) *Attorney, Agent, or Firm* — Harness, Dickey & Pierce, P.L.C.

(57) ABSTRACT

A non-transitory recording medium stores a print job creating program, which when executed by a processor causes a computer to execute a process. The process includes generating with a first print job generator a temporary print job based on a change of a setting value associated with printing received from a user, determining with a line breaking rule check unit whether execution of a post-process recorded in the temporary print job is acceptable in a printer, based on a definition of a line breaking rule representing acceptability of the post-process according to a combination of setting values that are not processed by the printer, presenting with a line breaking rule check result presenting unit a result of the determination to the user, and generating with a second print job generator a print job based on determination of a setting value associated with the printing received from the user.

8 Claims, 9 Drawing Sheets

| COMBINATION OF SHEET SIZES | ACCEPTABILITY OF POST-PROCESS |
|---|---|
| NO COMBINATION | ACCEPTABLE |
| COMBINATION WITH SPECIAL SHEET SIZE | ACCEPTABLE |
| COMBINATION WITH NON-SPECIAL SHEET SIZE (COMBINATION WITH SHEET SIZE OTHER THAN SPECIAL SHEET SIZE) | NOT ACCEPTABLE |

| COMBINATION OF SHEET SIZES | ACCEPTABILITY OF POST-PROCESS |
|---|---|
| NO COMBINATION | ACCEPTABLE |
| COMBINATION WITH SPECIAL SHEET SIZE | ACCEPTABLE |
| COMBINATION WITH NON-SPECIAL SHEET SIZE (COMBINATION WITH SHEET SIZE OTHER THAN SPECIAL SHEET SIZE) | NOT ACCEPTABLE |

FIG.6

| SUPPORT FUNCTION | POSSIBLE VALUE FOR FUNCTION |
|---|---|
| STAPLE | AUTOMATIC TOP LEFT, TWO AT LEFT, TWO AT CENTER |
| PUNCH | 2 HOLES, 3 HOLES |
| BINDING | RING BINDING, CASE BINDING |
| SHEET FEEDING TRAY | AUTOMATIC, TRAY 1, TRAY 2, TRAY 3 |
| SHEET RECEIVING TRAY | AUTOMATIC, UPPER TRAY, SADDLE STITCHING TRAY |
| ... | ... |

# PRINT SYSTEM, PRINT JOB CREATING DEVICE, PRINT JOB CREATING METHOD, AND RECORDING MEDIUM

BACKGROUND OF THE INVENTION

1. Field of the Invention

The disclosures discussed herein relate to a print system, a print job creating device, a print job creating method, and a non-transitory recording medium storing a print job creating program.

2. Description of the Related Art

There is a related-art image recording device that is capable of preventing unnecessary image output when a post-process is not allowed to be executed (e.g., see Patent Document 1).

An application program for creating a print job may sometimes cause a printer to perform a post-process recorded in the print job by transmitting the created print job to the printer. However, it appears to be difficult to detect whether execution of the post-process recorded in the print job is acceptable in the printer before the print job is transmitted to the printer.

RELATED ART DOCUMENTS

Patent Document

Patent Document 1: Japanese Laid-open Patent Publication No. 2002-281217

SUMMARY OF THE INVENTION

Accordingly, it is a general object in one embodiment of the present invention to provide a print system, a print job creating device, a print job creating method, and a non-transitory recording medium storing a print job creating program capable of detecting whether execution of a post-process recorded in a print job is acceptable in a printer before the print job is transmitted to the printer that substantially obviate one or more problems caused by the limitations and disadvantages of the related art.

According to one aspect of the embodiment, there is provided a non-transitory recording medium storing a print job creating program representing a sequence of instructions, the print job creating program which when executed by a processor causing a computer to execute functions. The functions include a first print job generator configured to generate a temporary print job based on a change of a setting value associated with printing received from a user; a line breaking rule check unit configured to determine whether execution of a post-process recorded in the temporary print job is acceptable in a printer, based on a definition of a line breaking rule representing acceptability of the post-process according to a combination of setting values that are not processed by the printer; a line breaking rule check result presenting unit configured to present a result of the determination to the user; and a second print job generator configured to generate a print job based on determination of a setting value associated with the printing received from the user.

The object and advantages of the invention will be realized and attained by means of the elements and combinations particularly pointed out in the claims.

It is to be understood that both the foregoing general description and the following detailed description are exemplary and explanatory and are not restrictive of the invention as claimed.

Other objects and further features of the present invention will be apparent from the following detailed description when read in conjunction with the accompanying drawings.

DESCRIPTION OF THE PREFERRED EMBODIMENTS

In the following, a description will be given of embodiments of the present invention based on examples by referring to the accompanying drawings. Note that the examples given below describe a simplified print system for convenience of illustration; hence, the print system of the present invention is not limited to these examples.

First Embodiment

System Configuration

Figure 1:
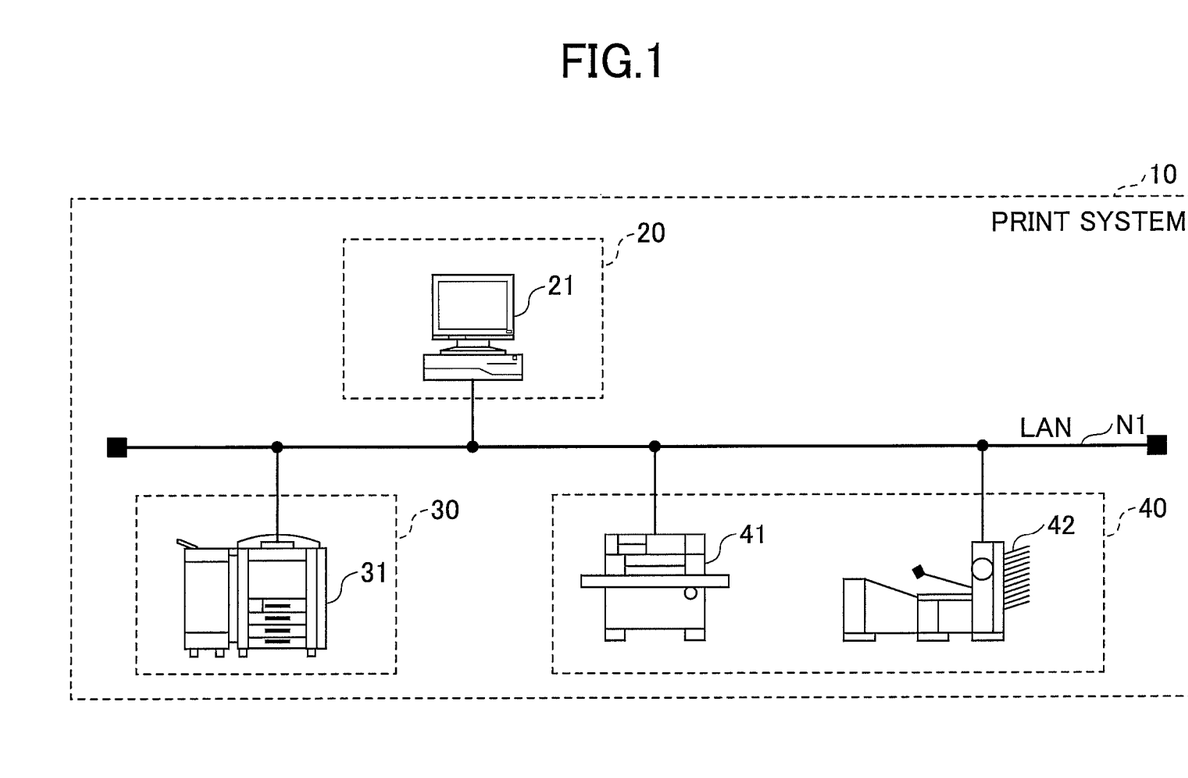
FIG. 1 is a block diagram illustrating an example of an overall configuration of a print system according to a first embodiment.

FIG. 1 is a block diagram illustrating an example of an overall configuration of a print system according to a first embodiment. A print system according to the first embodiment includes a print job creating unit 20, a print unit 30, and a post-process unit 40, which are connected to one another via a network N1 such as LAN (Local Area Network).

The print job creating unit 20 may, for example, be configured to include a print job creating device 21 that is connected to the network N1. The print job creating device 21 is implemented by an information processing apparatus on which a print job creating application is installed. The print job creating application enables the print job creating device 21 to create a print job or edit the print job.

For example, the print job creating application enables the print job creating device 21 to execute an imposition (number-up) function for attaching plural logical page images to a sheet surface, and image editing function for attaching a header, a footer, and a page number to the sheet surface. Furthermore, the print job creating application enables the print job creating device 21 to specify post-process instructions such as punching or stapling for binding a document.

The print job creating unit 20 instructs the print unit 30 or the post-process unit 40 to execute printing by transmitting print jobs to the print unit 30 or the post-process unit 40. Note that the print job creating unit 20 may efficiently schedule jobs of the print unit 30 or the post-process unit 40, or may optionally alert a user when an error has occurred. The print job creating device 21 is configured to include one or more information processing apparatuses.

The print unit 30 causes the printer 31 to execute printing based on a print job received from the print job creating unit 20. The print unit 30 may be able to cause the printer 31 to print a document/image file, a scanned image file scanned by a scanner, and edited versions of the document/image file and the scanned image file.

The setting configuration of the print unit 30 may vary with the print system 10 to be employed. The print unit 30 is configured to include a color or a monochrome printer 31. Note that the printer 31 not only includes a printing function but also includes a post-process such as stapling, punching, cutting, case binding, and ring binding.

The post-process unit 40 executes the post-process based on the print job received from the print job creating unit 20. Note that the post-process unit includes post-process devices such as a folding machine, a saddle stitching binder, a case binder, a cutter, an inserting machine, and a sorting machine. The post-process unit 40 executes a post-process, such as folding, saddle stitching binding, case binding, cutting, inserting, or sorting, on a recording sheet printed by the print unit 30. The setting configuration of the post-process unit 40 may vary with the print system 10 to be employed. The post-process unit 40 further includes post-print process devices such as a stapler 41, and a punching machine 42.

Note that the post-process devices or post-print process devices included in the post-process unit are not necessarily connected via the network N1. The post-process devices or post-print process devices that are not connected via the network N1 may also be examples of the post-process devices or post-print process devices that execute post-processes or post-print processes based on the print jobs.

A user uses the print job creating application to assign instructions for editing, imposing, inserting text, sheet setting, and post-processing from the print job creating device 21. The user requests the print unit 30 and the post-process unit 40 to execute printing or a post-process by transmitting the print jobs.

Hardware Configuration

Figure 2:
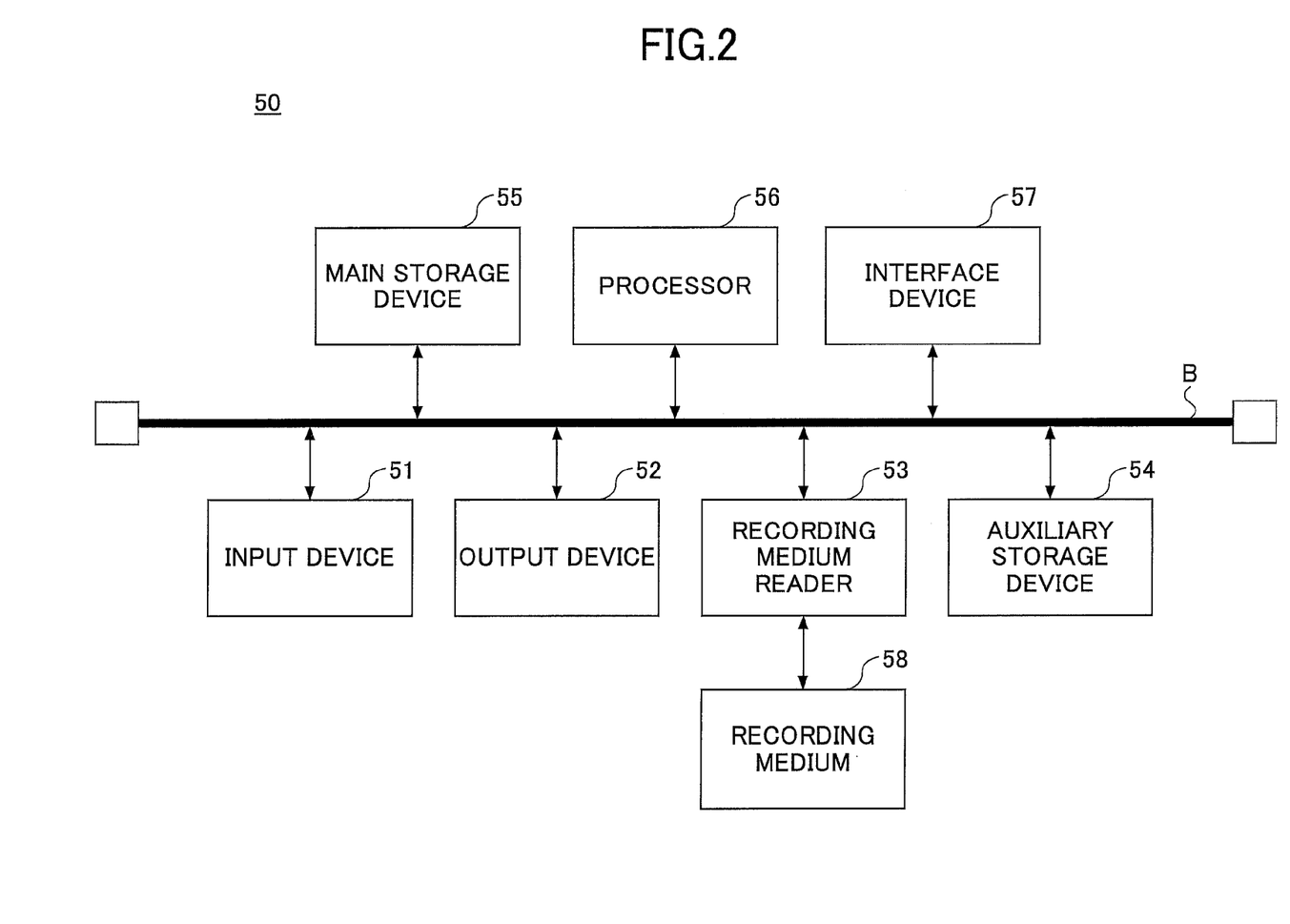
FIG. 2 is a hardware configuration diagram of an example of an information processing apparatus.

The print job creating device 21 is implemented by an information processing apparatus having a hardware configuration illustrated, for example, in FIG. 2. FIG. 2 is a hardware configuration diagram of an example of an information processing apparatus. An information processing apparatus 50 of FIG. 2 includes an input device 51, an output device 52, a recording medium reader 53, an auxiliary storage device 54, a main storage device 55, a processor 56, and an interface device 57 that are connected to one another via a bus B.

The input device 51 includes a keyboard, a mouse, and the like. The input device 51 is used for inputting various signals. The output device 52 includes a display device and the like. The output device is used for displaying various windows or data. The interface device 57 includes a modem, a LAN card, and the like. The interface device 27 is used for connecting to the network N1.

The print job creating application installed on the print job creating device 21 may at least be part of various programs to control the information processing apparatus 50. Note that the print job creating application may be provided by the distribution of a recording medium 58 or be downloaded from the network N1.

The recording medium 58 may be various types of recording media, examples of which include a CD-ROM (compact disc read-only memory), a flexible disk, and a magneto-optical disk that record information optically, electrically, or magnetically, and a semiconductor memory such as a ROM (read-only memory) and a flash memory that record information electrically.

When the recording medium 58 storing the print job creating application is set in the recording medium reader 53, the print job creating application is installed in the auxiliary storage device 54 from the recording medium 58 via the recording medium reader 53. The downloaded print job creating application is installed in the auxiliary storage device 54 via the interface device 57. The auxiliary storage device 54 stores the installed print job creating application.

The main storage device 55 reads the print job creating application from the auxiliary storage device 54 and stores the read print job creating application. Then, the processor 56 executes later-described various processes based on the print job creating application stored in the main storage device 55.

Software Configuration

Figure 3:
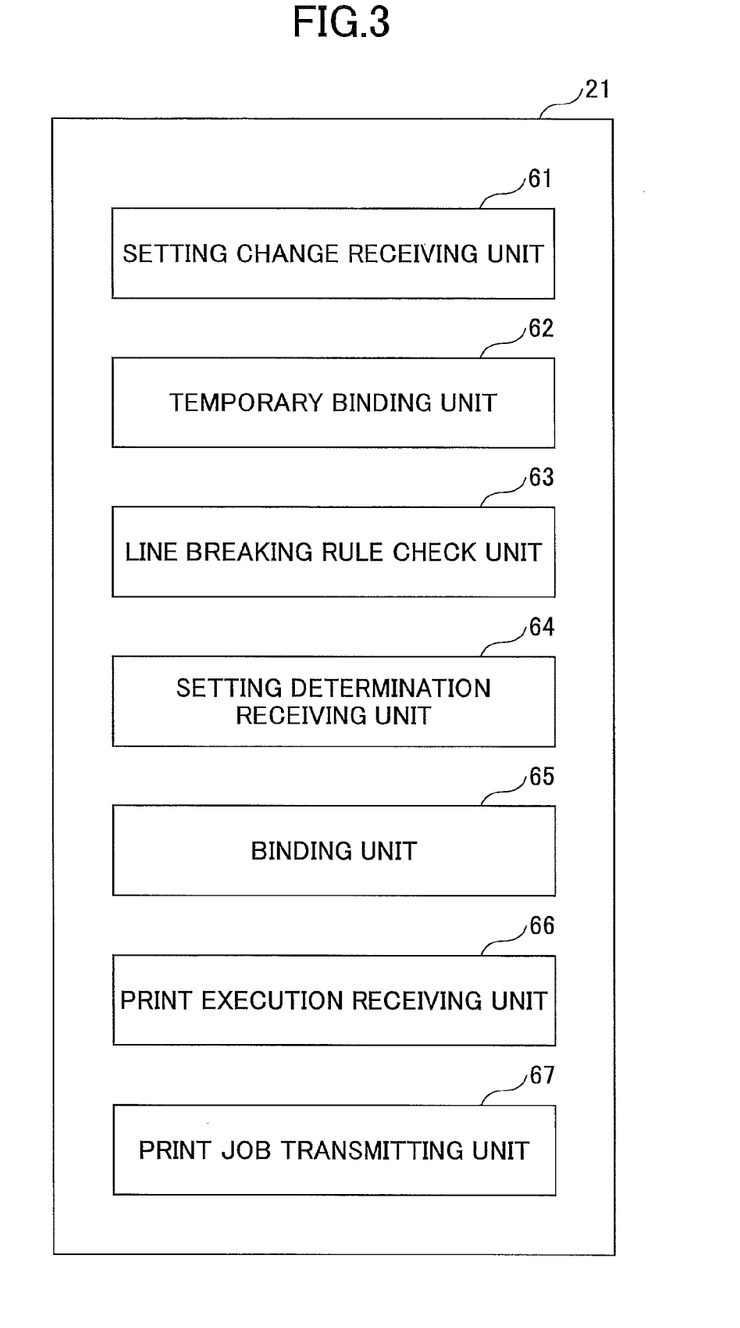
FIG. 3 is a process block diagram illustrating an example of a print job creating device 21.

The print job creating device 21 implements a process block illustrated in FIG. 3 based on the print job creating application. FIG. 3 is a process block diagram illustrating an example of the print job creating device 21.

The print job creating device 21 executes the print job creating application to implement a setting change receiving unit 61, a temporary binding unit 62, a line breaking rule check unit 63, a setting determination receiving unit 64, a binding unit 65, a print execution receiving unit 66, and a print job transmitting unit 67.

The setting change receiving unit 61 performs screen control of the UI, and receives a setting change from a user such as a sheet setting. When receiving a setting change from a user, the setting change receiving unit 61 requests the temporary binding unit 62 to execute temporary binding. The temporary binding unit generates a temporary print job (temporary job information) based on content of the received setting change. The line breaking rule check unit 63 performs a line breaking rule check based on the temporary job information and generates a result of the line breaking rule check. Note that the setting change receiving unit 61 may cause the generated temporary job information and the result of the line breaking rule check to be reflected, for example, on a screen.

The setting determination receiving unit 64 performs screen control of the UI, and receives a setting determination for the sheet setting from the user. When receiving the setting determination from the user, the setting determination receiving unit 64 requests the binding unit 65 to execute binding. The binding unit 65 generates a print job (job information) based on content of the setting determination received from the user. The line breaking rule check unit 63 performs a line breaking rule check based on the job information and generates a result of the line breaking rule check. Note that the setting change receiving unit may cause the generated job information and the result of the line breaking rule check to be reflected, for example, on the screen.

The print execution receiving unit 66 performs screen control of the UI, and receives print execution from the user. When receiving the print execution from the user, the print execution receiving unit 66 sends a print request to the print job transmitting unit 67. The print job transmitting unit 67 transmits the print job to the printer 31 to execute printing.

Details of Process

In the following, a description is given of details of the process of the print system 10 according to the first embodiment. In the following description, the change of the sheet setting is employed as an example of the setting change.

Process for Changing Sheet Setting

Figure 4:
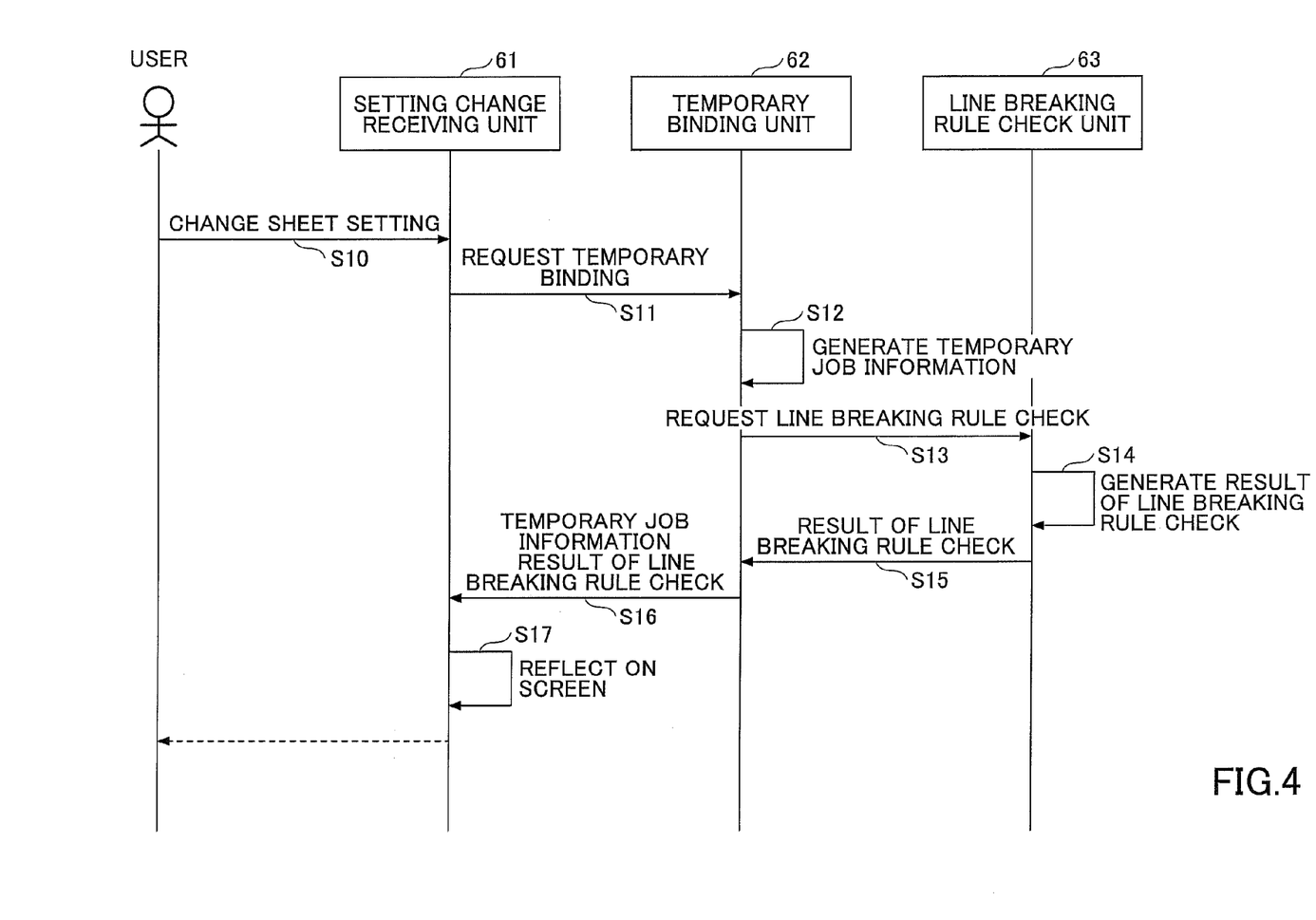
FIG. 4 is a sequence diagram illustrating an example of a process for changing the sheet setting.

FIG. 4 is a sequence diagram illustrating an example of a process for changing the sheet setting. In step S10, the user operates the print job creating device 21 to change the sheet setting via the UI. When receiving the change of the sheet setting from the user, the setting change receiving unit 61 of the print job creating device 21 requests the temporary binding unit 62 to execute temporary binding in step S11.

When receiving the temporary binding request, the temporary binding unit 62 generates temporary job information based on the setting content including the sheet setting selected by the user in step S12. The temporary job information holds information similar to job information. The temporary job information is configured to be temporarily generated every time the temporary binding is executed (i.e., every time the sheet setting is changed).

Further, the job information is configured to serve as job information for printing that is necessary for the printer 31 to execute printing. Job information includes information necessary for binding a printed material, such as imposition information, post-process information, sheet information, document composition information, and overlay information.

The imposition information includes layout information of a document. The post-process information includes information of post-processes such as punching and stapling. The sheet information includes information of a sheet such as a size of the sheet and a type of the sheet. The document composition information includes information of a document composition such as chaptering and the number of pages. The overlay information includes information such as a header, a footer, and inserted images.

Figure 5:
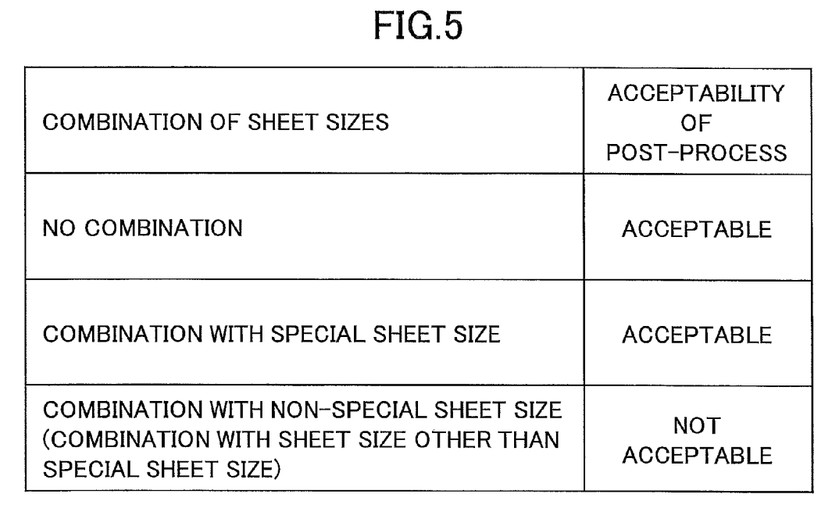
FIG. 5 is a configuration diagram illustrating an example of information about a combination of sheet sizes.

The purpose of generating the temporary job information is to acquire information about a combination of sheet sizes that is only acquired after binding. An example of the information about a combination of sheet sizes is given in FIG. 5. FIG. 5 is a configuration diagram illustrating an example of information about a combination of sheet sizes.

In the print job creating device 21, sheet settings for chapters, an exceptional sheet setting, and an inserting sheet setting may be set such that plural sheet settings may be set with respect to one print job. The information about the combination of the sheet sizes of FIG. 5 indicates acceptability of the post-process. For example, according to the information about the combination of the sheet sizes illustrated in FIG. 5, the post-process is not allowed to be performed when the combination of the sheet sizes includes a non-special sheet size (i.e., the combination with a sheet size other than the special sheet size). When plural sheet sizes are combined, physical factors such as a discharge direction of a printed sheet, and a position of the post-process device may inhibit the printer 31 from performing the post-process.

The combination with the special size satisfies the following conditions 1 and 2, simultaneously. The condition 1 may be a combination of a small sheet size and a large sheet size, where a longitudinal side of the small sheet size matches a short side of the large sheet size. An example of such a combination of the sheet sizes may be a combination of an A4 size and an A3 size. Further, the condition 2 may satisfy a relationship between an opening direction and a sheet direction as noted below. In a case of a sheet that is opened bilaterally, the small size sheet directs a portrait (vertical) side and the large size sheet directs a landscape (horizontal) side. In a case of a sheet that is opened upward, the small size sheet is set in a portrait (vertical) side and the large size sheet is set in a landscape (horizontal) side.

Note that when binding is executed by changing the sheet setting, the sheet is turned according to a rule held by the print job creating device 21. Hence, it may be possible to determine, only after the binding, whether the combination of sheet sizes corresponds to the combination with the special sheet size illustrated in FIG. 5, which indicates that execution of the post-process is acceptable.

In step S13, the temporary binding unit 62 requests the line breaking rule check unit 63 to perform a line breaking rule check on the temporary job information. In step S14, the line breaking rule check unit 63 performs a line breaking rule check based on the temporary job information and generates a result of the line breaking rule check.

The print job creating device 21 includes a definition of line breaking rules. The definitions of the line breaking rules include DevCaps line breaking rules merged with autonomous line breaking rules specific to the print job creating device 21. The DevCaps line breaking rules include definitions of the combined setting values that are unable to be processed by the printer 31. Examples of the DevCaps line breaking rules include a staple and a labelling sheet being unable to be set simultaneously, or a sheet having an A6 size being unable to be fed from a "sheet feeding tray 2".

The autonomous line breaking rules specific to the print job creating device 21 are definitions of setting values that are logically inconsistent, or exclusive settings that are uniquely set in the print job creating device 21. Examples of the autonomous line breaking rules specific to the print job creating device 21 include a staple being unable to be set at two places on the right with a left-open print job, or the post-process being unable to be set with the combination with a non-special sheet size.

Further, a result of a line breaking rule check is information derived from the definitions of the line breaking rules and job information or temporary job information. The result of the line breaking rule check is generated when the line breaking rules are checked based on job information or temporary job information. The result of the line breaking rule check includes capability information of the printer 31 and line breaking rule error information.

Figure 6:
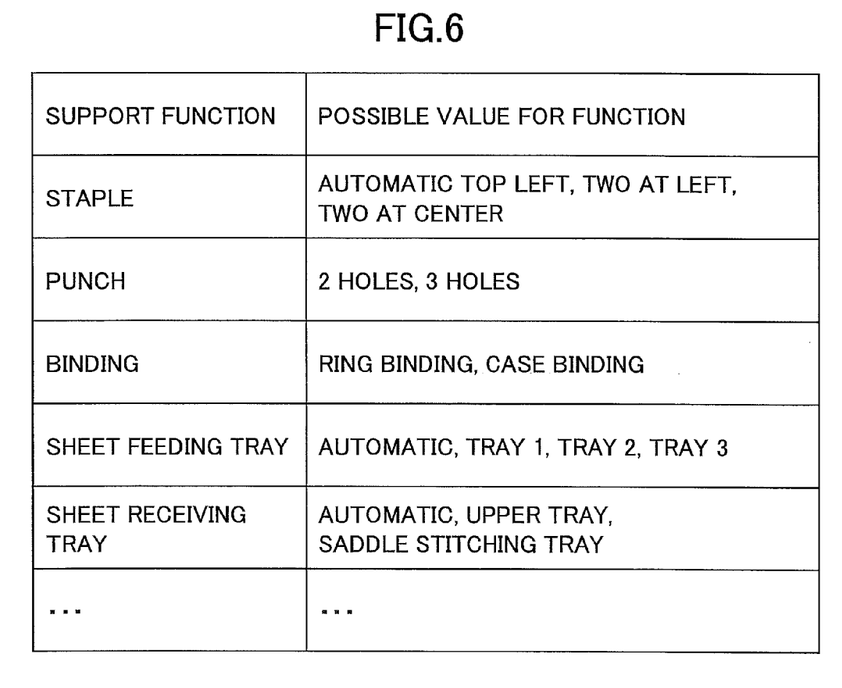
FIG. 6 is a configuration diagram illustrating an example of capability information of a printer.

FIG. 6 is a configuration diagram illustrating an example of capability information of the printer. The capability information of the printer includes information of a device capability that may be set via the UI of the print job creating device 21.

The capability information of the printer illustrated in FIG. 6 includes items of a support function and a possible value for the function. For example, the capability information of the printer illustrated in FIG. 6 includes staple, punch, binding, a sheet feeding tray, and a sheet receiving tray, as support functions. Possible values for the functions include values set in current job information or temporary job information, values that are allowed to be set in current job information or temporary job information, and values checked with the line breaking rules that are not allowed to be set in current job information or temporary job information.

The line breaking rule error information is error information set for a case in which the line breaking rule related values are simultaneously set when the job information or the temporary job information is checked based on the definitions of the line breaking rules. The line breaking rule error information is set when the line breaking rule error is generated.

The result of the line breaking rule check generated in step S14 may include information such as the combination of the sheet sizes based on which, whether to perform the post-process is determined. When the combination of the sheet sizes is not acceptable for executing the post-process, the line breaking rule information is added to the result of the line breaking rule check. In step S15, the line breaking rule check unit 63 returns the generated result of the line breaking rule check to the temporary binding unit 62. Further, in step S16, the temporary binding unit 62 returns the generated temporary job information and the result of the line breaking rule check to the setting change receiving unit 61.

In step S17, the setting change receiving unit 61 causes the temporary job information and the result of the line breaking rule check to be reflected on a screen. When the result of the line breaking rule check is provided with the line breaking rule error information, the setting change receiving unit 61 displays a line breaking error on the screen. When the result of the line breaking rule check is not provided with the line breaking rule error information, the setting change receiving unit 61 causes the sheet setting changed by the user to be reflected on the screen.

Hence, even when the combination of the sheet sizes is a combination with a non-special sheet size due to change of the sheet setting, the print job creating device 21 may be able to determine whether it is possible to perform the post-process by requesting the temporary binding, which may enable the print job creating device 21 to detect the line breaking rule error before the execution of printing.

Process for Determining Sheet Setting

Figure 7:
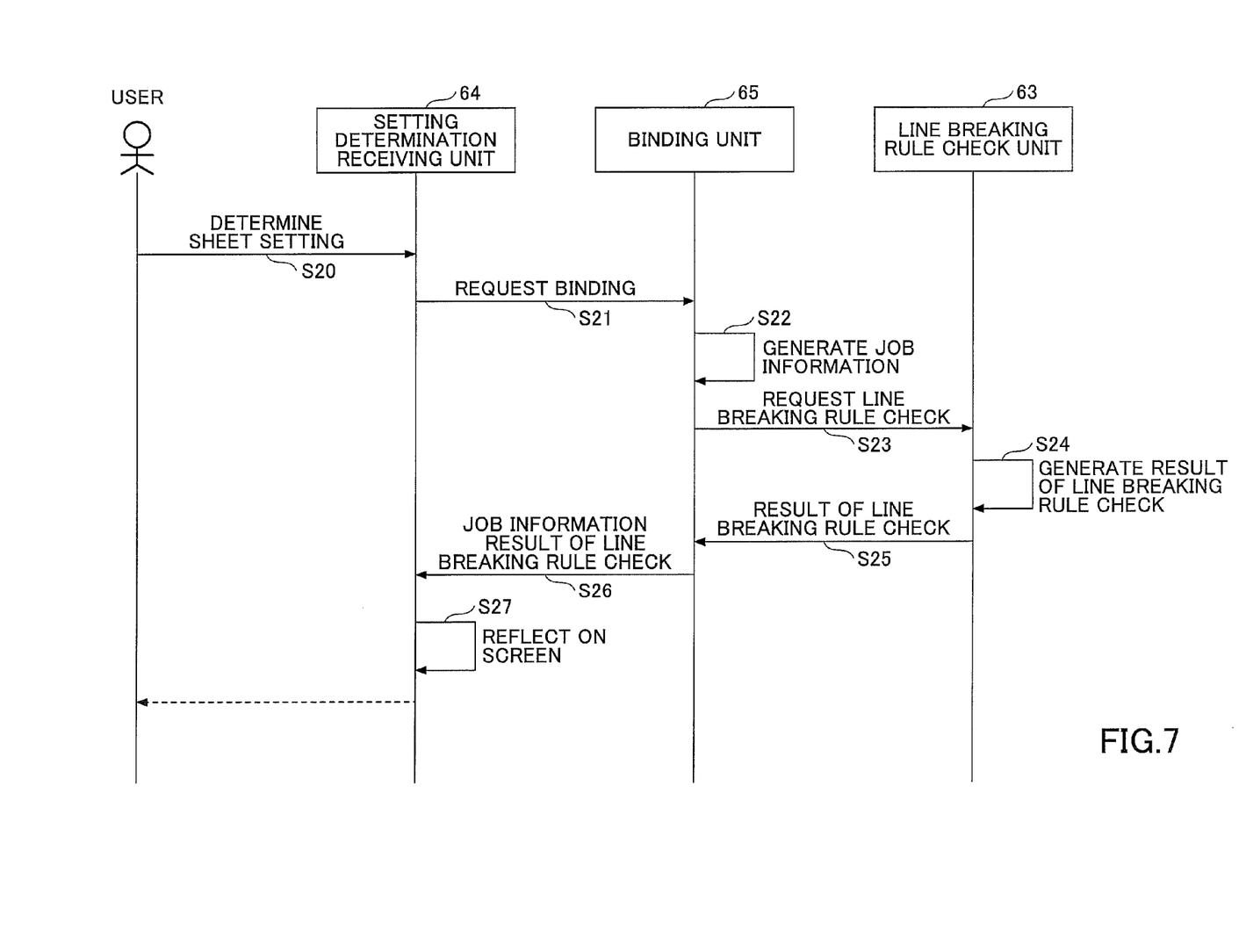
FIG. 7 is a sequence diagram illustrating an example of a process for determining the sheet setting.

FIG. 7 is a sequence diagram illustrating an example of a process for determining the sheet setting. In step S20, the user operates the print job creating device 21 to determine the sheet setting via the UI. For example, the user may be able to determine the sheet setting by pressing an OK button on an impose/sheet type setting screen. When receiving the determination of the sheet setting from the user, the setting change receiving unit 64 of the print job creating device 21 requests the binding unit 65 to execute binding in step S21.

When receiving the binding request, the binding unit 65 generates job information based on the setting content including the sheet setting determined by the user in step S22. In step S23, the binding unit requests the line breaking rule check unit 63 to execute a line breaking rule check on the job information.

Further, in step S24, the line breaking rule check unit 63 performs a line breaking rule check based on the job information and generates a result of the line breaking rule check. In step S25, the line breaking rule check unit 63 returns the generated result of the line breaking rule check to the binding unit 65. Further, in step S26, the temporary binding unit 65 returns the generated job information and the result of the line breaking rule check to the setting determination receiving unit 64.

In step S27, the setting determination receiving unit 64 causes the job information and the result of the line breaking rule check to be reflected on a screen. Note that in this process, since the temporary binding has been executed already, the line breaking rule error information will not be added to the result of the line breaking rule check generated in step S24. That is, in the print job creating device 21, the sheet setting that results in the line breaking rule error has already been eliminated when the sheet setting is changed. Hence, the line breaking rule error will not be generated when the sheet setting is determined.

In the print job creating device 21, the user determines the sheet setting or the post-process that will not generate a line breaking rule error. Hence, it may be possible to prevent the sheet setting or the post-process determined by the user from not being applied the print job.

Process for Executing Printing

Figure 8:
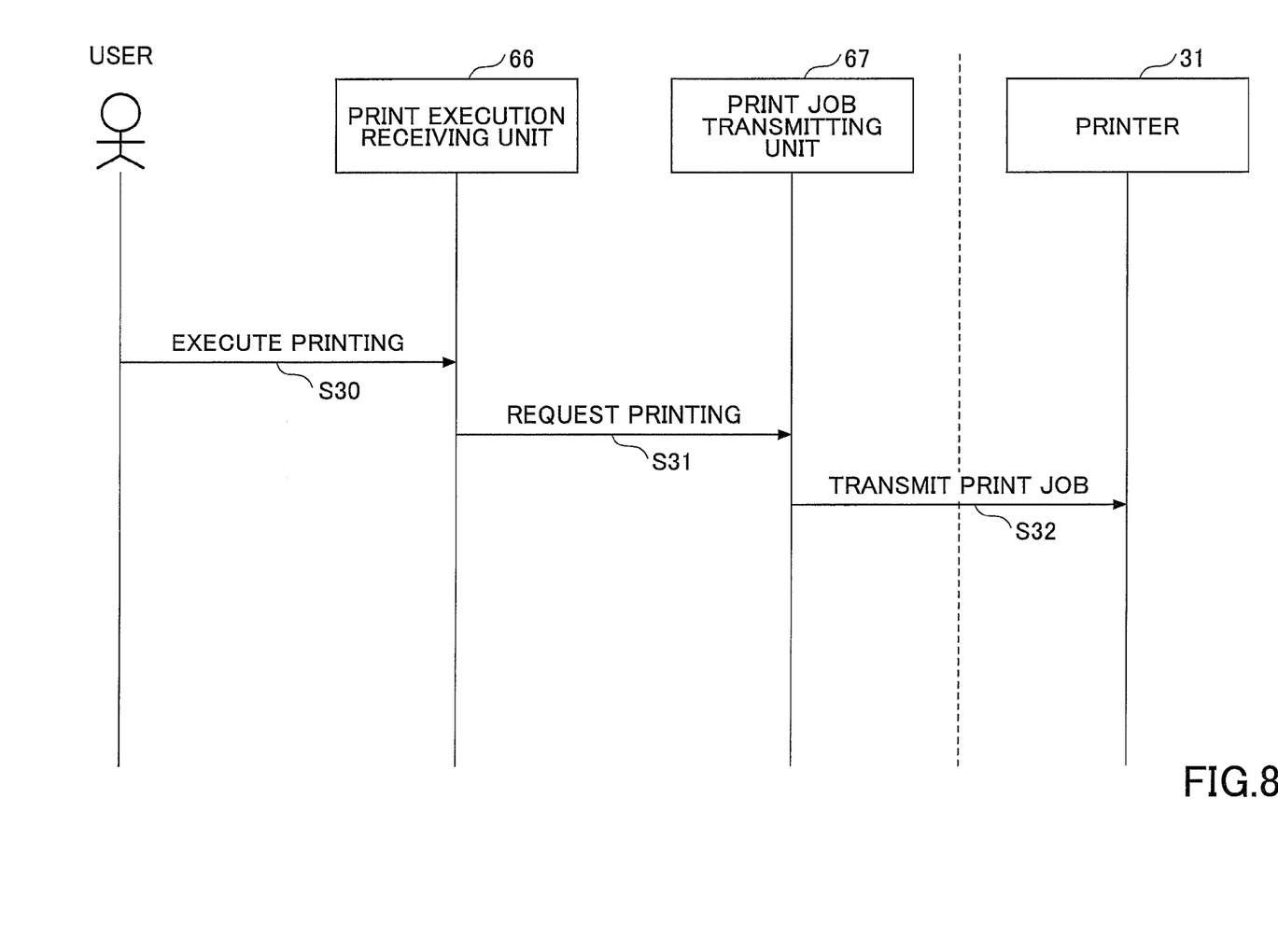
FIG. 8 is a sequence diagram illustrating an example of a process for executing printing.

FIG. 8 is a sequence diagram illustrating an example of a process for executing printing. In step S30, the user operates the print job creating device 21 to instruct execution of printing via the UI. When receiving the instruction for executing printing from the user, the print execution receiving unit 66 of the print job creating device 21 reports the print request to the print job transmitting unit 67 in step S31.

In step S32, the print job transmitting unit 67 transmits the print job to the printer 31 to execute printing. Note that in this process, factors resulting in the line breaking rule error have been eliminated already by the temporary binding mechanism, as described above. Hence, the print job creating device 21 will not generate the line breaking rule error when executing printing.

Display Process of Line Breaking Rule Error when Changing Sheet Setting

Figure 9:
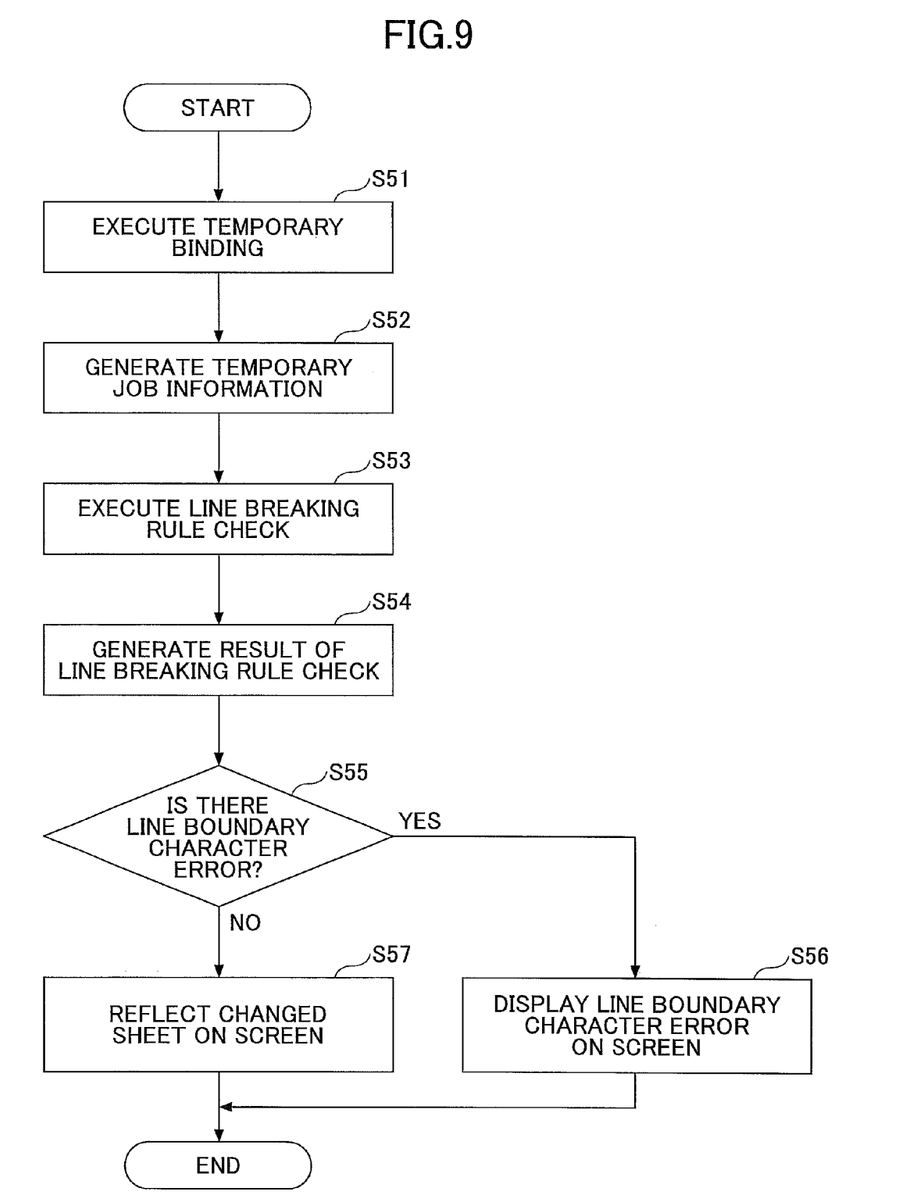
FIG. 9 is a flowchart illustrating an example of a display process of a line breaking rule error when the sheet setting is changed.

FIG. 9 is a flowchart illustrating an example of a display process of a line breaking rule error when the sheet setting is changed. The display process of a line breaking rule error when the sheet setting is changed illustrated in FIG. 9 starts when the user operates the print job creating device 21 to change the sheet setting via the UI.

When the user changes the sheet setting via the UI, the setting change receiving unit 61 requests the temporary binding unit 62 to execute temporary binding. The temporary binding unit 62 executes temporary binding based on already set information such as the post-process or imposition and the changed sheet setting in step S51.

After the execution of temporary binding, the temporary binding unit 62 generates temporary job information in step S52. The temporary job information indicates the latest binding information (e.g., post-process and imposition settings) edited by the user. The temporary job information includes information that indicates whether the combination of sheet sizes includes the combination with the non-special sheet size. The information indicating whether the combination of sheet sizes includes the combination with the non-special sheet size is acquired by the execution of the temporary binding.

For example, when a sheet having a B5 size is to be set via a cover sheet inserting screen with respect to a print job having a main body setting of A4 and a staple setting of automatic top left, the temporary binding unit 62 generates temporary job information including a main body setting of A4, a staple setting of automatic top left, a cover sheet setting of a B5 size, and a sheet setting of the combination with the non-special sheet size.

The temporary binding is executed by changing the sheet setting via the impose-sheet type setting screen, by pressing an OK button via a sheet type (exception) screen, and by changing the sheet setting via an inserting sheet setting screen (a cover sheet, a chapter break sheet, an index sheet, and an inserting sheet).

The line breaking rule check unit 63 performs a line breaking rule check based on the temporary job information (step S53), and generates a result of the line breaking rule check (step S54). For example, when the line breaking rule check unit 63 performs a line breaking rule check on the temporary job information including a main body setting of A4, a staple setting of automatic top left, a cover sheet setting of a B5 size, and a sheet setting of the combination with the non-special sheet size, the line breaking rule check unit 63 generates error information 1 [Staple: automatic top left—the combination with a non-special sheet size (A4, B5)] as a result of the line breaking rule check. Note that the line breaking rule check is a process of determining whether there are any setting values of the generated temporary job information between which there is a line breaking rule (exclusive) relationship.

For example, in the print job creating device 21, the line breaking rule check is performed based on the device capability of the printer 31 (i.e., what setting is acceptable and what setting is not acceptable) subject to printing and the line breaking rules that are logically inconsistent (i.e., the autonomous line breaking rules specific to the print job creating device 21). The print job creating device 21 may be able to acquire information indicating that the line breaking rule errors have occurred corresponding to the setting value A and the setting value B of the temporary job information by performing the line breaking rule check.

Figure 10:
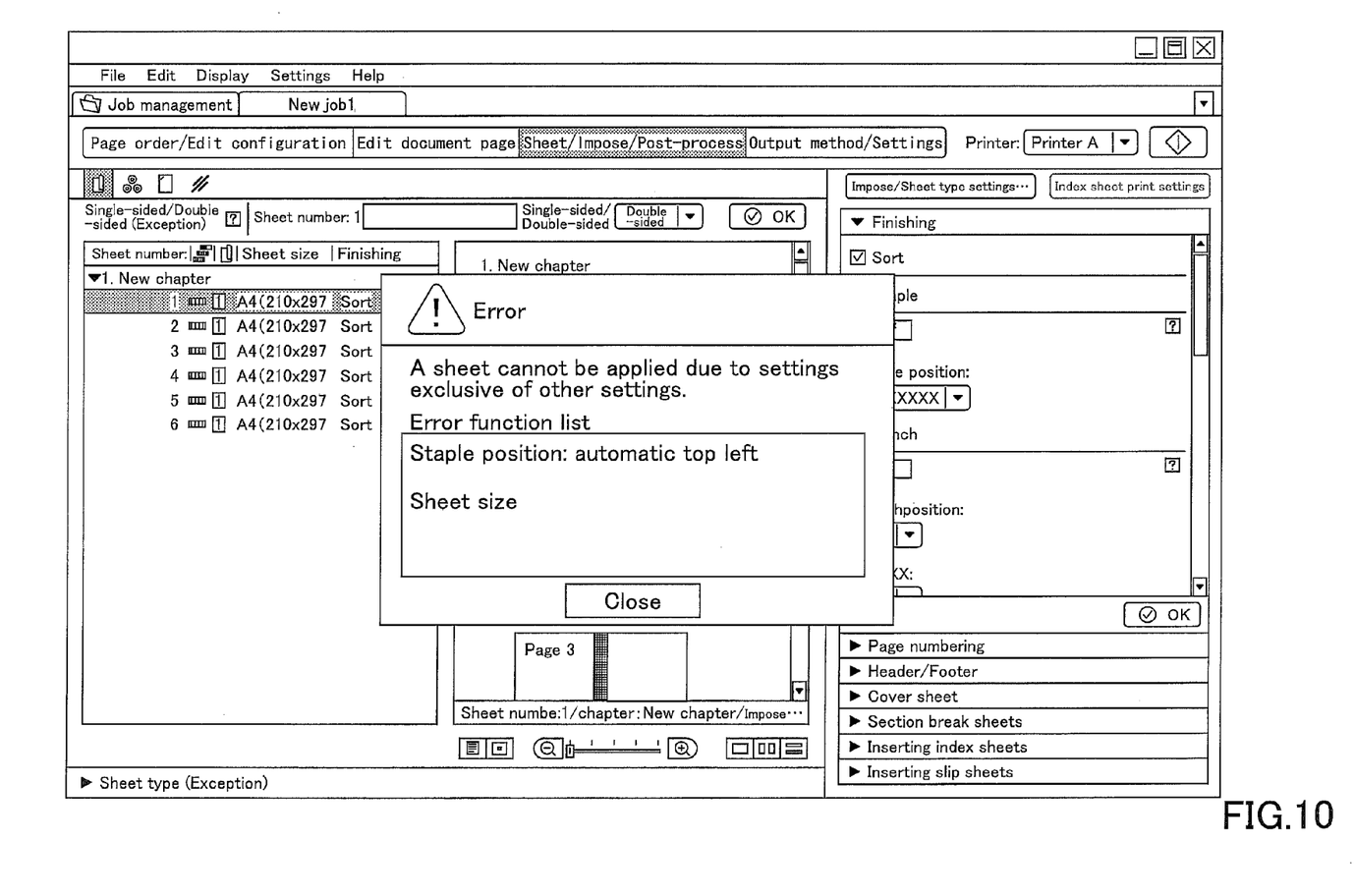
FIG. 10 is an image diagram illustrating an example of an error screen.

In step S55, the setting change receiving unit 61 determines whether the line breaking rule errors have occurred by referring to the result of the line breaking rule check returned from the temporary binding unit 62. When a line breaking rule error has occurred, the setting change receiving unit 61 reports to the user that the line breaking rule error has occurred by displaying, for example, an error screen illustrated in FIG. 10 in step S56. FIG. 10 is an image diagram illustrating an example of the error screen. On the other hand, when a line breaking rule error has not occurred, the setting change receiving unit 61 causes the sheet setting changed by the user to be reflected on the screen (step S57).

SUMMARY

In the printer system 10 according to the embodiment, it may be possible to detect whether or not a post-process generates the line breaking rule error by generating temporary job information based on the changed sheet setting before generating job information for transmitting the determined sheet setting to the printer 31. The temporary binding, which is executed by temporarily generating temporary job information when the sheet setting is changed, is used to acquire information that is only available after the binding is executed to generate job information. The temporary job information is temporarily generated such that the temporary binding will not be reflected in the job information that is to be transmitted to the printer 31.

Hence, in the print system 10 according to the embodiment, even when the combination of the post-process set in the job information and the changed sheet setting (the changed sheet size) results in a line breaking rule error, the line breaking rule error may be reported to the user before the job information to be transmitted to the printer 31 is generated. Hence, the user may be able to avoid executing printing while the combination of the post-process set in the job information and the changed sheet setting (the changed sheet size) corresponds to the line breaking rule error, which may prevent a print job having unintended settings from being generated due to the cancellation of the post-process.

According to the embodiment of the present invention, it may be possible to detect whether execution of the post-process recorded in the print job is acceptable in the printer before the print job is transmitted to the printer.

The present invention is not limited to the embodiments specifically disclosed above, and various alterations or modifications may be made without departing from the spirit and the scope of the invention. Note that a first print job generator recited in the claims equates with the temporary binding unit 62. A line breaking rule check unit recited in the claims equates with the line breaking rule check unit 63. A line breaking rule check result presenting unit recited in the claims equates with the setting change receiving unit 61. A second print job generator recited in the claims equates with the binding unit 65.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although the embodiment of the present invention has been described in detail, it should be understood that various changes, substitutions, and alterations could be made hereto without departing from the spirit and scope of the invention.

The present application is based on and claims the benefit of priority of Japanese Priority Application No. 2013-052507 filed on Mar. 14, 2013, the entire contents of which are hereby incorporated by reference.

What is claimed is:

1. A non-transitory recording medium storing a print job creating program representing a sequence of instructions, the print job creating program which when executed by a processor causing a computer to execute a process, with respect to a print job having a combination of settings of two or more sizes of sheets, the process comprising:
   generating with a first print job generator a temporary print job based on a change of a setting value associated with printing received from a user;
   determining with a line breaking rule check unit whether execution of a binding-process recorded in the temporary print job is acceptable in a printer, the binding-process including binding a combination of a small size sheet and a large size sheet in which a longitudinal length of the small size sheet matches a short length of the large size sheet by analyzing a relationship between a binding direction (or opening direction) and a sheet direction, based on a definition of a line breaking rule representing acceptability of the binding-process according to a combination of setting values that are not processed by the printer;
   presenting with a line breaking rule check result presenting unit a result of the determination to the user; and
   generating with a second print job generator a print job based on determination of a setting value associated with the printing received from the user.

2. The non-transitory recording medium as claimed in claim 1, wherein
   when determining that the execution of the post-process recorded in the temporary print job is not acceptable in the printer based on the definition of the line breaking rule, the line breaking rule check unit generates line breaking rule error information, and
   the line breaking rule check result presenting unit presents the generated line breaking rule error information to the user.

3. The non-transitory recording medium as claimed in claim Z wherein
   the line breaking rule check unit generates the line breaking rule error information including the combination of the setting values recorded in the temporary print job that are not processed by the printer.

4. The non-transitory recording medium as claimed in claim 1, wherein
   the definition of the line breaking rule includes a definition of the combination of the setting values that are not processed by the printer, and a definition of an exclusive setting of the setting values that is uniquely set by the print job creating program.

5. The non-transitory recording medium as claimed in claim 1, wherein
   the change of the setting value associated with printing indicates a change of sheet setting, and wherein the line breaking rule check unit determines a combination of sheet sizes of print sheets based on directions of the print sheets output from the printer and sizes of the print sheets, and wherein when the combination of the sheet sizes does not allow the printer to execute the post-process, the line breaking rule check unit determines that the post-process recorded in the temporary print job and the change of the sheet setting received from the user result in line breaking rule errors.

6. A print job creating device, comprising:
a first print job generator configured to generate a temporary print job based on a change of a setting value associated with printing received from a user;
a line breaking rule check unit configured to determine whether execution of a binding-process recorded in the temporary print job is acceptable in a printer, the binding-process including binding a combination of a small size sheet and a large size sheet in which a longitudinal length of the small size sheet matches a short length of the large size sheet by analyzing a relationship between a binding direction (or opening direction) and a sheet direction, based on a definition of a line breaking rule representing acceptability of the binding-process according to a combination of setting values that are not processed by the printer;
a line breaking rule check result presenting unit configured to present a result of the determination to the user; and
a second print job generator configured to generate a print job based on determination of a setting value associated with the printing received from the user.

7. A print job creating method executed by a computer, the method comprising:
generating a temporary print job based on a change of a setting value associated with printing received from a user;
determining whether execution of a binding-process recorded in the temporary print job is acceptable in a printer, the binding-process including binding a combination of a small size sheet and a large size sheet in which a longitudinal length of the small size sheet matches a short length of the large size sheet by analyzing a relationship between a binding direction (or opening direction) and a sheet direction, based on a definition of a line breaking rule representing acceptability of the binding-process according to a combination of setting values that are not processed by the printer;
presenting a result of the determination to the user; and
generating a print job based on determination of a setting value associated with the printing received from the user.

8. A print system comprising:
a print job creating device; and
a printer, wherein
the print job creating device includes
    a first print job generator configured to generate a temporary print job based on a change of a setting value associated with printing received from a user;
    a line breaking rule check unit configured to determine whether execution of a binding-process recorded in the temporary print job is acceptable in a printer, the binding-process including binding a combination of a small size sheet and a large size sheet in which a longitudinal length of the small size sheet matches a short length of the large size sheet by analyzing a relationship between a binding direction (or opening direction) and a sheet direction, based on a definition of a line breaking rule representing acceptability of the binding-process according to a combination of setting values that are not processed by the printer;
    a line breaking rule check result presenting unit configured to present a result of the determination to the user; and
    a second print job generator configured to generate a print job based on determination of a setting value associated with the printing received from the user, wherein
the printer executes printing based on the received print job.

* * * * *